Sept. 8, 1970 J. H. HUFFORD 3,527,960

ELECTRONIC COUNTING CIRCUIT

Filed Oct. 4, 1967 2 Sheets-Sheet 1

INVENTOR.
JAMES H. HUFFORD
BY
Meyer, Tilberry & Body
ATTORNEYS

INVENTOR.
JAMES H. HUFFORD
BY
Meyer, Tilberry & Body
ATTORNEYS

United States Patent Office 3,527,960
Patented Sept. 8, 1970

3,527,960

ELECTRONIC COUNTING CIRCUIT

James H. Hufford, Moline, Ill., assignor to E. W. Bliss Company, Canton, Ohio, a corporation of Delaware Filed Oct. 4, 1967, Ser. No. 672,907
Int. Cl. H03k 21/00, 21/04
U.S. Cl. 307—226 5 Claims

ABSTRACT OF THE DISCLOSURE

There is disclosed herein a counting circuit having a storage capacitor and a threshold detector, such as a unijunction transistor, coupled to the capacitor for producing an output signal when the capacitor has been charged to a predetermined voltage level. For each received count pulse, a step charge is applied to the storage capacitor. The magnitude of each step charge is inversely proportional to the decimal number of a preselected count of the count pulses.

The present invention relates to the art of counter circuits and, more particularly, to electronic counters wherein a capacitor is step charged for each received count pulse.

The present invention is particularly adapted for producing and controlling step charges applied to a storage capacitor in an electronic counter circuit and will be discussed with particular reference thereto; however, the invention has somewhat broader applications and it may be used in a variety of counter circuits.

Prior art counters included electromechanical devices whose operating speed was insufficient for many applications. Additionally, such electromechanical devices employed numerous operating parts that are subject to wear and require critical adjustments for proper operation. Also, included in the prior art counters are solid state ring counters, bistable multivibrator circuits and cold cathode counters. These latter prior art counters necessitated the use of more components than necessary, and, thus increased the cost for producing such countes.

Another form of prior art counter employs a storage capacitor which is step charged by a plurality of input pulses until the capacitor is charged to a level sufficient to actuate a threshold circuit. This form of counter has heretofore been limited to applications wherein the input pulse rate to the capacitor was relatively high so that the capacitor charge would not dissipate prior to actuating the threshold circuit. Such counters also had the disadvantage of providing output pulses which were not of sufficient duration to perform a proper switching function. Such prior art counters also included circuits employing variable adjustable resistors, as is shown in United States Patent 3,240,153, wherein the number of pulses required to step charge the capacitor to the desired level is determined by the magnitude of such input pulses. Temperature variations of the employed components could easily change the input pulse magnitude and thereby result in an erroneous count. They also had the disadvantage of not having an easily changeable preselected count.

The present invention is directed toward an improved counting circuit which includes an easily changeable preselected count; a capacitor charging circuit for applying step charges to a storage capacitor wherein the step charges are dependent upon count number only and not upon the magnitude of the count pulses; and a circuit that controls the charging circuit so that the magnitude of each step charge is inversely proportional to the decimal number of the preselected count of the count pulses.

The present invention contemplates a counting circuit for counting pulses received from a count pulse source and providing an output signal upon a preselected count wherein the circuit includes a storage capacitor and a threshold circuit means coupled to the storage capacitor and providing the output signal when the capacitor has been charged to a predetermined voltage.

In accordance with one aspect of the present invention, the counting circuit includes; a capacitor charging means applying a step charge to the capacitor for each count pulse received by the circuit; and a count selector control means that controls the charging means so that the magnitude of each step charge is inversely proportional to the decimal number of the preselected count of the count pulses.

In accordance with another aspect of the invention, the counting circuit includes: a voltage source; an electronic control means having first, second, and control electrodes and exhibiting the characteristic of applying charging current to the capacitor from the voltage source only when a forward biasing signal is applied to the control electrode, and that the magnitude of the charging current is dependent upon the magnitude of the forward biasing signal; and, a count selector control means for applying to the electronic control means, for each count pulse, the forward biasing signal of a magnitude which is inversely proportional to the number of the preselected count pulses.

The primary object of this invention is to provide an improved electronic counting circuit which is relatively inexpensive to manufacture and is economical to operate.

Another object of this invention is the provision of means for easily controlling step charges applied to a capacitor in a counting circuit.

A further object of this invention is the provision of an electronic counter having an improved capacitor charging means for step charging a storage capacitor.

A further object of this invention is the provision of an electronic counter having an electronic control means for monitoring the charging current of capacitor charging means.

A futher object of this invention is the provision of an electronic counter having an electronic control means wherein the capacitor charging current is dependent upon the magnitude of a forward biasing signal applied to the capacitor charging means.

These and other objects and advantages of the invention will become apparent from the following description of specific examples embodying the invention and the appended claims, when taken in conjunction with the accompanying drawings illustrating the described specific examples embodying the invention in which:

GENERAL DESCRIPTION

Figure 1:
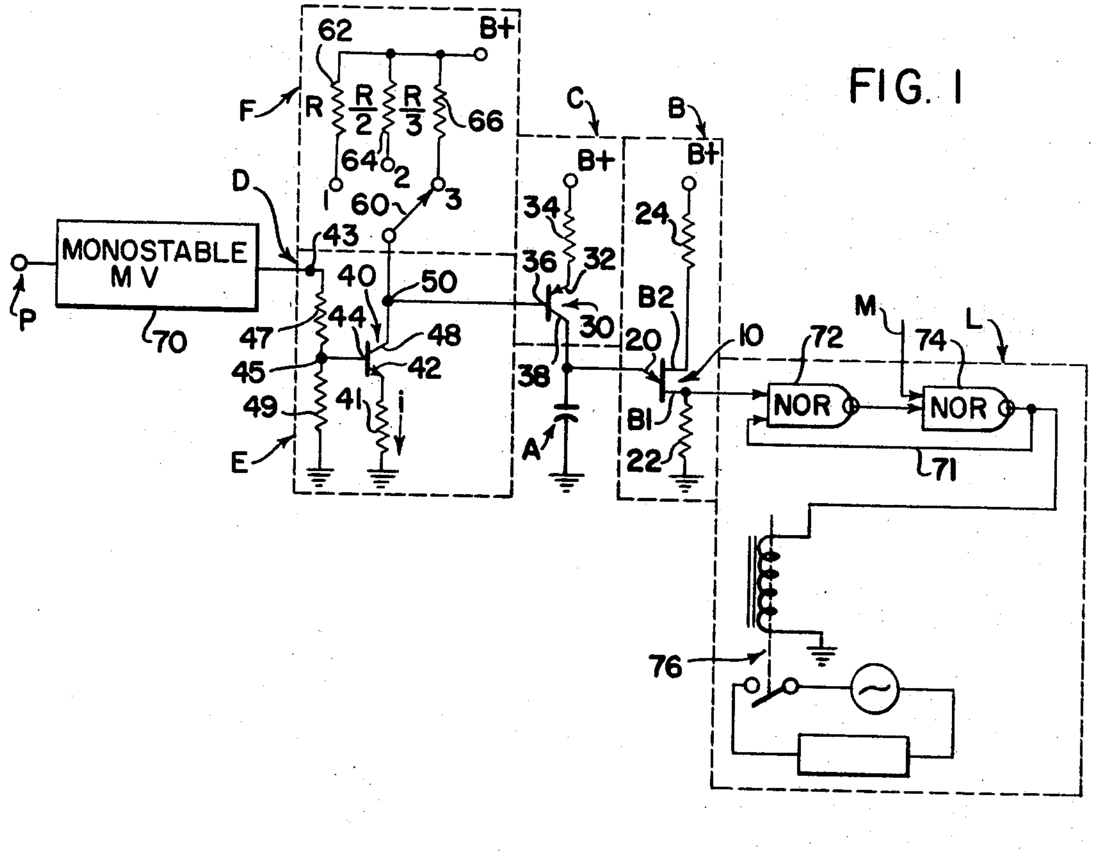
FIG. 1 is a schematic diagram of the counting circuit showing one preferred embodiment of this invention.
Figure 3:
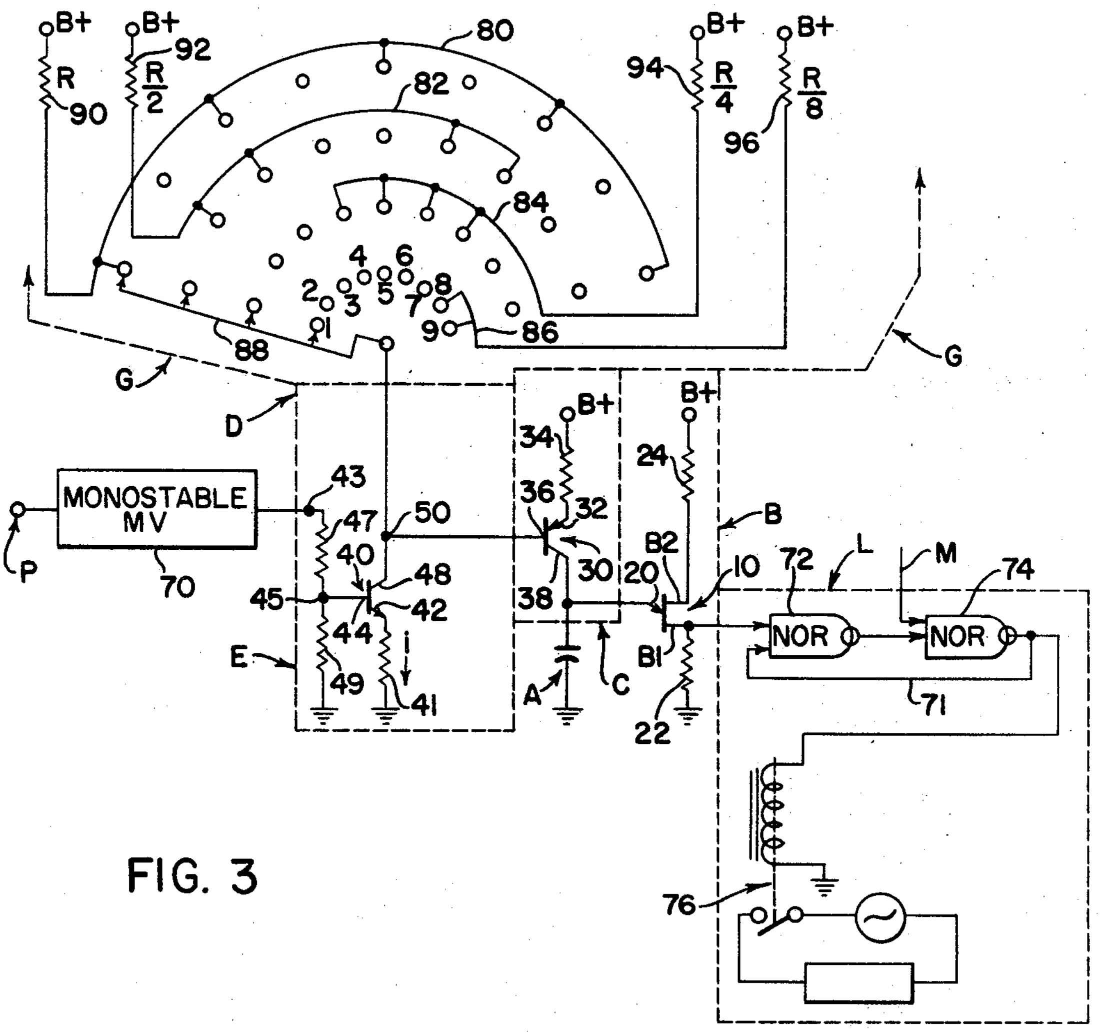

Referring now to the drawings which are for the purpose of illustrating the preferred embodiments of the invention and not for the purpose of limiting the same, FIG. 1 shows a counting circuit comprising storage capacitor A, threshold detector circuit B, capacitor charging circuit C, and count selector D, which is comprised of switching circuit E and selector F. The counting circuit of FIG. 1 counts pulses received at P and produces an output signal for operating a typical load, such as L. The counting circuit shown in FIG. 3 operates in the same manner as the counting circuit shown in FIG. 1, the difference in the two embodiments residing in count selector D. In FIG. 3, count selector control D is composed of switching circuit E and selector G.

THRESHOLD DETECTOR CIRCUIT

The threshold detector circuit B is shown in FIG. 1, as well as capacitor A, one side of which is wired to ground and the other side coupled to the threshold detector circuit B. Circuit B is composed of unijunction transistor 10 having its first base electrode B1 connected to ground through load resistor 22 and its second base electrode B2 connected to a B+ voltage source through resistor 24. Transistor 10 also has an emitter 20, serving as the input for the threshold detector circuit B, which is connected to the non-grounded side of capacitor A. The output of circuit B is taken across load resistor 22, with the junction of base electrode B1 and resistor 22 being connected to the load L.

CAPACITOR CHARGING CIRCUIT

The capacitor charging circuit C, as shown in FIG. 1, includes: PNP transistor 30, whose emitter electrode 32 is connected to a B+ voltage source through resistor 34 to develop the capacitor current at collector electrode 38. Collector 38 is connected to capacitor A at the same point that emitter 20 of transistor 10 and the non-grounded side of capacitor A are tied together. Control electrode 36 serves as the input for the capacitor charging circuit and receives the output from the count selector control D.

COUNT SELECTOR CONTROL

The count selector control D includes switching circuit E and selector F. Switching circuit E includes NPN transistor 40, as an electronic switch, having its emitter 42 connected to ground through reference resistor 41. Transistor 40 has its base 44 coupled to the junction of resistors 47 and 49 which define a voltage divider 45. Collector 48 of transistor 40 serves as the output for this electronic switch, and is connected to the output of selector F to establish a reference point 50, which is, in turn, connected to control electrode 36 of transistor 30. Selector F, in the embodiment shown, includes resistors 62, 64 and 66. These resistors have one side tied to B+ voltage source and the other side selected by selector arm 60. Selector arm 60 serves as the output of selector F which is connected to reference point 50.

LOAD CIRCUIT

A typical load is shown at L, composed of bistable multi-vibrator 71 consisting of NOR circuits 72 and 74, and a switching relay 76. Each NOR circuit 72, or 74 may take the form, for example, as the resistor, transistor logic circuit shown in FIG. 7.5 of General Electric's Transistor Manual, Seventh Edition. The output of the threshold detector circuit B is taken from the junction of resistor 22 and base B1 of transistor 10 and is connected to one input at NOR circuit 72. The output of the bistable multivibrator 71 is taken from the output of NOR circuit 74 and is used as a latch back to NOR circuit 72 and is also connected to relay 76. The multivibrator 71 is reset by application of a momentary positive voltage pulse to terminal M, coupled to the input circuit of NOR circuit 74.

OPERATION

With reference to FIG. 1, a counting pulse received at P triggers bistable multivibrator 70, wherein a positive pulse of constant amplitude and duration is produced at 43 and is impressed across divider network 45 to ground. This positive pulse forward biases transistor 40, causing current to flow through the selected resistor 66 from a voltage source to ground. Selector F is shown for simplicity as a three position selector. It is understood that selector F can be expanded to any number of positions. Resistor 62 has been given the resistance value of R. A voltage drop across resistor 62, if it had been selected, would have been of such value as to establish a voltage level at reference 50 that would have impressed upon control electrode 36 sufficient bias to cause enough current to flow in charging circuit C to charge capacitor A to the threshold voltage of unijunction transistor 10 with an input of a single count pulse P. Resistor 64 has been given the resistance value of R/2 while resistor 66 has been given the representative resistance value of R/3. Therefore, it can be seen that, when these resistors are selected individually, they will produce varying voltage drops at reference point 50, and thus establish varying voltage levels at this reference point. The greater the voltage drop across selector F, the lower will be the voltage amplitude at reference point 50 that will be impressed upon base 36 as a forward biasing voltage. A low voltage level input to base 36 will cause a high amount of current to flow in transistor 30 and thus establish a high charge on capacitor A. The lower the voltage drop across selector F is, the higher the voltage level at reference point 50 will be, with the result that less current will flow through transistor 30. Thus the charging voltage impressed upon capacitor A will be low.

Figure 2:
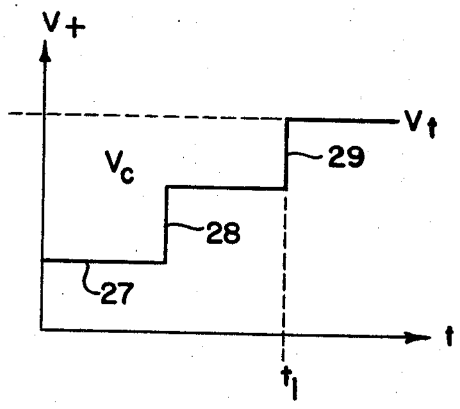
FIG. 2 shows a voltage versus time graph, illustrative of the step charges impressed upon the storage capacitor; and, FIG. 3 is a schematic diagram of the counter circuit showing an alternate embodiment of this invention.

From the foregoing it should be apparent that the current flowing in charging circuit C is directly porportional to the voltage drop appearing across a selected impedance of selector F. Therefore, selecting resistor 64 will set the voltage level at reference point 50 to a level such that the current flowing through circuit C will be of such magnitude that the capacitor A will be charged only to ½ of the amplitude necessary to cause the threshold circuit to operate. Selecting resistor 66 will set the voltage level at reference point 50 to cause the current flowing through charging circuit C to impress upon capacitor A a charging voltage of only ⅓ of the amplitude necessary to cause threshold detector circuit B to operate. Thus it can be seen, for the embodiment shown, that three count pulses at P are necessary to charge capacitor A to the amplitude necessary to cause the threshold circuit B to operate. These three charges of equal amplitude are illustrated in FIG. 2 by charges 27, 28 and 29 to reach threshold level V*t*. With no emitter current flowing, bases B1 and B2 of unijunction transistor 10 act like a simple voltage divider between B+ and ground, and a certain fraction of B+ will appear at the emitter 20. If the voltage from capacitor A applied at emitter 20 is less than the certain fraction of B+, emitter 20 will be reverse biased and only a small emitter leakage current will flow. If the voltage from capacitor A applied at emitter 20, illustrated by V*t*, becomes greater than this certain fraction of B+, emitter 20 will become forward biased and the threshold circuit B will operate.

Premature discharge of capacitor A is prevented in the backward direction by transistor 30, and in the forward direction by transistor 10. Upon receipt of the three charges, as shown by FIG. 2, capacitor A becomes charged sufficiently to cause transistor 10 to conduct and to produce a positive output signal at base B1. The output signal at base B1 drives a load typified by L. The positive output signal at B1 is impressed upon NOR circuit 72, whose output is a binary "0" signal that produces a positive signal output at NOR circuit 74. This output of NOR circuit 74 is a positive binary "1" signal that is used as a latch back to NOR circuit 72, and as the energizing force to operate relay 76 to complete the load circuit. The multivibrator 71 is reset by momentarily applying a positive pulse to terminal M of NOR circuit 74, to prepare the circuit for the next series of count pulses.

SECOND EMBODIMENT

Referring now to FIG. 3, there is shown a second embodiment of the invention. This embodiment is quite similar to that of FIG. 1, and, accordingly, like components in FIGS. 1 and 3 are identified with like character references. Of significance is the fact that the selector F in FIG. 1 has been replaced by the BCD selector G in FIG. 3.

BCD SELECTOR

The binary coded decimal (BCD) selector G shown in FIG. 3 has nine positions and four levels selectable. The nine positions selectable are 1 through 9. The four levels of selection, designated as 80, 82, 84 and 86, are selected in combination by selector arm 86. Four resistors 90, 92, 94 and 96, are connected from a B+ voltage source to the various levels 80, 82, 84 and 86, and then selectively tied to the reference point 50 by movable arm 88. Resistor 90 has been given the representative resistance value of R. Resistor 92 has the representative value of $R/2$, resistor 94 has the representative value of $R/4$ and resistor 96 has the representative value of $R/8$. Level 80 consists of resistor 90 connected to positions 1, 3, 5, 7 and 9 of selector G. Level 82 consists of resistor 92 connected to positions 2, 3, 6 and 7. Level 84 consists of resistor 94 connected to positions 4, 5, 6 and 7. Level 86 consists of resistor 96 connected to positions 8 and 9. Thus, for a four bit binary or binary coded decimal system, resistors 90, 92, 94 and 96 have decimal weights of 1, 2, 4 and 8, respectively.

OPERATION

The operation of the embodiment of FIG. 3 is quite similar to that of the embodiment of FIG. 1, and accordingly, only the differences, as applied to the BCD selector G, will hereinafter be described in detail. The representative resistance value R, given to resistor 90, has been chosen as the base unit resistance wherein for a single counting pulse at P, a voltage amplitude is developed at reference point 50 to sufficiently control the current through transistor 30, so as to charge capacitor A to the threshold level to cause transistor 10 to conduct, and to produce an output signal from circuit B. Having assigned resistance values of $R/2$ to resistor 92, $R/4$ to resistor 94 and $R/8$ to resistor 96 it can be seen that resistors 90, 92, 94 and 96 have representative values of binary decimal weights of 1, 2, 4 and 8. With proper selection, numerical evaluations of 1 through 9 can be achieved. For example, with the selector set to 3, binary decimal weights 1 and 2, resistors 90 and 92 would be paralleled. The effective resistance would then be $R/3$. With the selector set to 7, for example, which is binary decimal weights 1, 2 and 4, resistors 90, 92 and 94 would be paralleled and the effective resistance would be $R/7$. Thus, it can be seen that the effective resistance selected binarily weighted will vary in inverse proportion to the 1 through 9 selector G setting.

The voltage level at reference point 50 proportionately increases as the voltage drop across the combined selected level resistors decreases, with the result that for increasing numerical selector settings there is a corresponding decrease in voltage, or IR, drop across selector G. As was previously stated, for a selector G setting of 1, the voltage level at reference point 50 is such that the forward bias on control electrode 36 of transistor 30 will cause sufficient current to flow in charging circuit C to charge capacitor A to the desired threshold level. For a selector setting of 3, the effective binary weighted resistance is $R/3$, giving ⅓ the voltage drop across selector G as that experienced with a selector setting of 1. Therefore, for this selector setting, the forward bias voltage level for control electrode 36 which is developed at reference point 50, will increase. This increased forward bias on control electrode 36 will correspondingly decrease the current flow in charging circuit C, so that the charging voltage amplitude for capacitor A will be ⅓ of that experienced for a selector setting of 1. Three pulses at P would thus be necessary to fully charge capacitor A. For a selector setting of 7, the voltage drop across selector G is $1/7$ of that for a selector setting of 1, the forward bias level at reference point 50 is increased correspondingly, the current flowing in charging circuit C is also $1/7$ of that for a setting of 1, with the resultant amplitude of the capacitor charge voltage being $1/7$ of the voltage required to reach the threshold level needed to cause current flow in detector circuit B. Thus, for a selector setting of 7, seven pulses at P are necessary to cause capacitor A to fully charge. As can be seen, the magnitude of each storage capacitor step charge is inversely proportional to the decimal number of the preselected count pulses. Also, it can be seen that the number of count pulses desired can be accurately and easily preselected.

From the foregoing it is apparent that the counting circuits of FIG. 1 and FIG. 3 include circuitry for step charging a storage capacitor, wherein the amplitude of each step charge is inversely proportional to the preselected number of counting pulses.

While particular embodiments of the invention have been illustrated and described, it will be obvious to those skilled in the art that various modifications may be made in the preferred embodiments of the present invention as disclosed in the drawings without departing from the spirit and scope of the appended claims.

Having thus described the invention, I claim:

1. A counting circuit for counting a plurality of count pulses received from a count pulse source and providing an output signal upon a preselected count and comprising:

- a storage capacitor;
- threshold detector circuit means coupled to said capacitor for providing a said output signal when said capacitor is charged to a predetermined voltage;
- a voltage source;
- an electronic control means having first, second and control electrodes, said first and second electrodes coupling said voltage source with said capacitor, said control means exhibiting the characteristic of applying charging current to said capacitor from said voltage source only when a forward biasing signal is applied to said control electrode and that the magnitude of said charging current is proportional to the magnitude of said forward biasing signal;
- a plurality of resistors;
- a plurality of selectable terminals 1 through N respectively representative of the decimal number of preselected counts 1 through N;
- circuit means coupling said voltage source with each said terminal 1 through N through at least one of said resistors so that the series resistance thus presented to any one said terminal is inverely proportional to the decimal number 1 through N of said terminal and, hence, of the preselected count;
- selector means for selectably coupling one of said terminals with the control electrode of said electronic control means;
- a reference resistor; and,
- switching means for, in response to each said count pulse, electrically connecting said reference resistor between a reference potential and the selected one of said terminals so that a said forward biasing signal is applied to the control electrode of said electronic control means of a magnitude inversely proportional to the decimal number of the selected one of said terminals.

2. A counting circuit as set forth in claim 1, wherein only one of said plurality of resistors is connected to any one of said terminals and each said resistor exhibits a resistance which is inversely proportional to the decimal number of the said terminal to which it is connected.

3. A counting circuit as set forth in claim 1, wherein said plurality of resistors include at least four resistors having resistance values which are respectively inversely proportional to decimal numbers 8, 4, 2 and 1 and said plurality of terminals include at least nine terminals respectively representative of decimal numbers 1 through 9, said circuit means coupling said four resistors to said terminals so that the resistance thus presented to any one of said terminals is inversely proportional to the decimal number of that said terminal.

4. A counting circuit as set forth in claim 1, wherein said switching means includes a second electronic control means having first, second and control electrodes, said first and second electrodes of said second electronic control means electrically coupling said reference resistor to the selected one of said terminals when a forward biasing signal is applied to said control electrode.

5. A counting circuit as set forth in claim 4, including means for applying a forward biasing signal of a given magnitude and duration to the control electrode of said second electronic control means for each said count pulse so that the other said electronic control means applies a said charging current to said storage capacitor for a given period of time for each said count pulse.

References Cited

UNITED STATES PATENTS

| | | | |
|---|---|---|---|
| 3,105,158 | 9/1963 | Nichols | 328—186 XR |
| 3,287,640 | 11/1966 | ReHage | 307—225 XR |
| 3,378,698 | 4/1968 | Kadah | 307—227 XR |

OTHER REFERENCES

RCA Technical Notes, RCA Tn No. 260, June 1959, Pulse Count Circuit by H. W. Stewart.

DONALD D. FORRER, Primary Examiner

J. ZAZWORSKY, Asistant Examiner

U.S. Cl. X.R.

307—246; 328—41, 48